Patented Nov. 24, 1925.

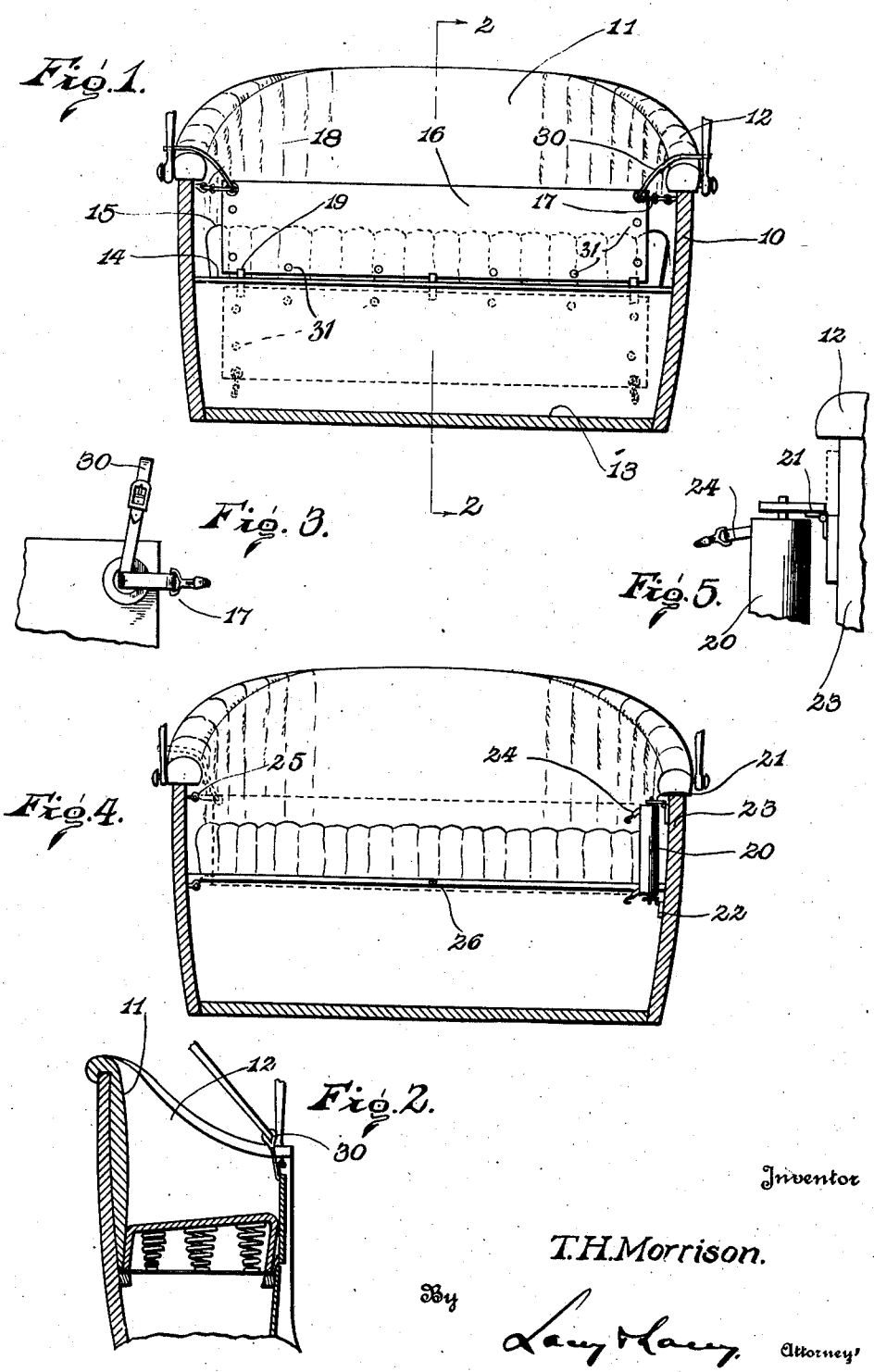

1,563,218

UNITED STATES PATENT OFFICE.

THOMAS H. MORRISON, OF MANITOWOC, WISCONSIN.

VEHICLE-SEAT ATTACHMENT.

Application filed May 31, 1924. Serial No. 717,042.

*To all whom it may concern:*

Be it known that I, THOMAS H. MORRISON, a citizen of the United States, residing at Manitowoc, in the county of Manitowoc and State of Wisconsin, have invented certain new and useful Improvements in Vehicle-Seat Attachments, of which the following is a specification.

My invention relates to an attachment for the seats of vehicles and more particularly for the seats of automobiles. The object of the invention is to convert the seat into a cot for a small child. This object is attained by furnishing a partition or curtain secured in such a manner to the front of the seat that a comfortable bed for the child may be made on the cushion of the seat. There is no danger of the child falling from the seat as the partition or curtain reaches sufficiently high to prevent this.

The device also furnishes a good storage place for parcels and packages when the owner of the vehicle is on a shopping expedition. Ordinarily, packages are deposited on the rear seat of an automobile and after riding some distance, they will generally be found on the floor of the vehicle and in that case there is great danger of breakage of fragile articles.

Without this device, a mother going for a ride with her husband in an automobile is obliged to sit in the rear seat with her baby when she might prefer to occupy the front seat with her husband. With this guard placed across the rear seat the baby will be fully protected and the mother will be relieved from all anxiety concerning the safety of the baby.

The device is preferably made of flexible material which may be easily rolled up or folded when not in use, and a material matching the upholstery of the vehicle will naturally be selected.

In the accompanying drawing:

Figure 1 represents a front elevation of a vehicle seat embodying my invention,

Figure 2 is a section along line 2—2 of Figure 1,

Figure 3 is a view showing one of the snap hooks for securing the guard or curtain, Figure 4 is a view similar to Figure 1, with a modified form of guard or curtain installed in front of the seat, and Figure 5 is an elevation on larger scale of some of the details.

In the drawing, the reference numeral 10 represents the rear seat of an automobile having a high back 11 and arm rests 12. The floor of the vehicle is indicated by the reference numeral 13, while the numeral 14 indicates the bottom of the seat, in which is disposed the usual spring seat cushion 15.

The apron or guard shown in Figures 1 and 2 of the drawing is represented by the reference numeral 16 and is shown stretched across the front of the seat. At the upper corners of the guard are furnished snap hooks 17 adapted to hook into eyelets 18 secured at the forward ends of the arm rests 12 or other convenient parts of the car. Along the bottom edge of the apron or guard 16 is furnished a series of straps 19 which are adapted to be secured to snaps or other suitable securing elements furnished in the bottom 14 of the seat beneath the cushion 15, as indicated in the drawing. In addition to the straps 19, other fastening elements 31 such as brass eyelets may be furnished along the bottom and side edges of the apron 16. Either lacing or snaps may be used in connection with these eyelets. Corresponding studs will then be furnished on the front of the seat. The guard is of sufficient height to reach some distance above the top of the cushion 15 so that there will be no chance of a child falling out over the top edge of the guard or apron. Similarly, as the bottom edge of the guard is secured beneath the cushion 15, there is no opportunity for a child to fall down between the cushion and the guard. Instead of the snap hooks 17, or in conjunction therewith, straps and buckles 30 may be used. These straps may then connect with the top stanchions or other suitable parts of the car and may be adjustable in length.

When the apron or guard is not in use, the snap hooks 17 may be detached from the eyelets 18 and the guard may then be dropped down, as indicated in dotted lines in Figure 1, to hang in front of the lower part of the seat, or be removed altogether. The guard is preferably made of flexible material such as canvas, rubber cloth or any other suitable material which will not be injured or broken when rolled or folded. It is not absolutely necessary that the apron or guard hang perpendicularly when in position and it may at times, be slightly inclined forwardly from the seat, if more room is desired, or rearwardly if the shape of the vehicle seat permits of this.

In Figure 4 of the drawing, a slightly modified form of attachment for the apron or guard is illustrated. In this modification, the apron or guard 20 is rolled up, in the manner of a window shade, on a roller pivoted in top and bottom bearings 21 and 22, which bearings are secured at one side of the seat, as indicated at 23. When not in use, the guard is rolled up, as indicated in this figure, to one side of the seat and out of the way of the passengers. The outer end of the guard is provided with snap hooks 24 or the like which are adapted to engage in eyelets 25 at the opposite side of the seat when the guard is stretched across the same as indicated by dotted lines in this figure. In order to firmly secure the bottom edge of the guard, one or more snaps 26 are furnished along this edge to engage with corresponding snaps in the bottom of the seat. These snaps 26 project below the bottom edge of the guard so that they will not interfere with the rolling up of the guard on the roller when not in use. As the bearings 21 and 22 are hinged at the corners (see Figure 5) it is possible to remove the apron 20 altogether, after having been rolled up, and the normally projecting leaves of the bearings folded flat against the sides of the arm rests as indicated by dotted lines in said figure.

Having thus described the invention, what I claim is:

A guard for vehicle seats comprising an apron of fabric material, and means for stretching said apron across the front of the seat; said means including a spring roller, folding brackets for said roller secured at one side of the seat, fastenings at the bottom and free edges of the apron, and corresponding fastenings on the sides and bottom of said seat whereby said apron may be completely removed and the brackets laid flat against the side of the seat.

In testimony whereof I affix my signature.

THOMAS H. MORRISON. [L. S.]